May 30, 1939.　　F. W. SMITH　　2,160,795
WINDSHIELD SUPPORT
Filed Oct. 7, 1937
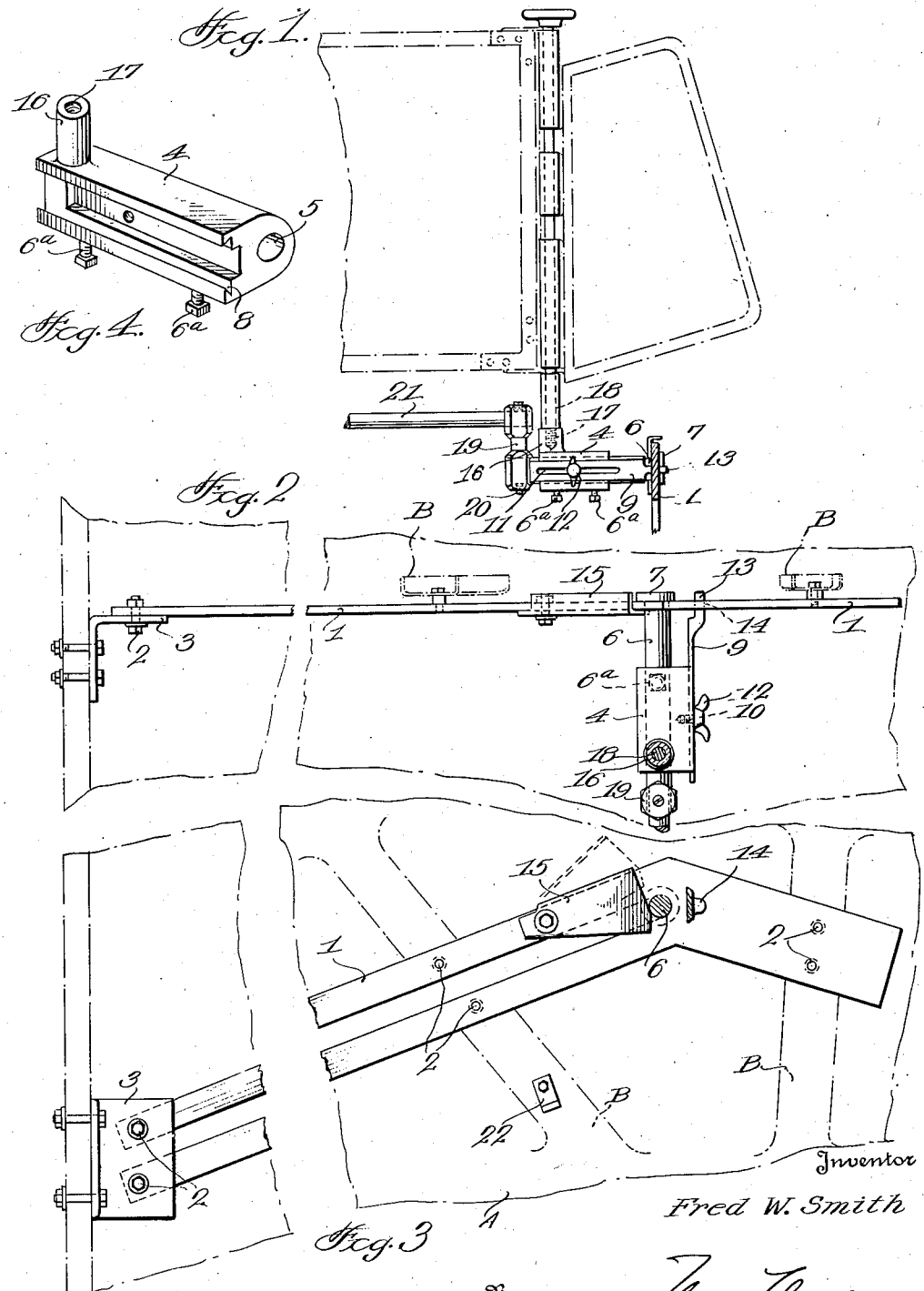
Inventor
Fred W. Smith
By
Max Ball
Attorney Patented May 30, 1939

2,160,795

UNITED STATES PATENT OFFICE 2,160,795

WINDSHIELD SUPPORT

Fred W. Smith, Adams, Mass.

Application October 7, 1937, Serial No. 167,813

10 Claims. (Cl. 296—85)

This invention relates to an improved construction and arrangement of the supporting devices for windshields mounted for use in connection with the rumble seat of an automobile, or with other forms of transportation where it may be desirable to use such an arrangement.

One of the objects of the invention is to provide a device of such character and construction that permits the windshield to be moved into operative position in front of the rumble seat, or when its use is not desired, out of sight by concealment within the rumble seat well.

A further object is the provision of a novel bracket for supporting the windshield structure. Still another object is the provision of several means cooperating with said bracket for rigidly supporting the windshield in operative extended position. More particularly, the invention comprises a windshield supporting bracket which carries spaced means for engaging the guide rails for said windshield at spaced points when the windshield is fully extended in upright position for use.

The invention will be more fully understood from the following description in connection with the accompanying drawing illustrating the device. Since the bracket and construction at each side of the windshield is the same, only one side thereof will be shown and described.

Figure 1 is a front elevation of the device showing the windshield partly broken away.

Figure 2 is a schematic plan view of the device as applied to the well of a rumble seat.

Figure 3 is a side elevation of the interior of the rumble seat well, showing the guide rails affixed to the body struts which are diagrammatically illustrated.

Figure 4 is a perspective view of the windshield supporting bracket, with parts removed.

The invention is shown as mounted in the automobile rumble seat well indicated at A and having body struts B to which the inclined guide rails or tracks 1 are attached at each side thereof by suitable means such as bolts 2. The forward portion of the guide rails are suitably secured to the body by angle brackets 3.

Mounted for sliding movement along these guide rails a bracket unit 4 is provided. This bracket is bored longitudinally throughout its length at 5 and accommodates a short rod 6, one end of which rides in the guide rails 1. The rod 6 has a flat head 7 which is provided to retain the rod in sliding engagement with the rails, and is locked to the bracket 4 by any suitable means, as bolts 6a. The bracket unit 4 has one face thereof provided with a longitudinal dovetail slot 8, spaced from the bore 5, in which a correspondingly dovetailed bar 9 is arranged to slide to act as a lock bolt for the windshield. The bar 9 may be locked with respect to the member 4 by means of a stud 10 seated therein and passing through a slot 11 in the bar, the latter being secured by a suitable nut 12. The bar 9 has a round stub 13 at one end and when the windshield is in raised position as shown in Figure 1, this stub projects through a suitable hole 14 which is provided in the face of the guide rail at a point spaced from the end of the longitudinal slot which guides the member 6. A gravity latch 15 is secured to the guide rail 1 and drops into the position shown in Figure 3 when the windshield is extended to its raised position. The member 4 has a boss 16 formed on the upper face thereof, and this boss is provided with an internally threaded socket 17 in which a post 18 is seated. The central and wing windshields are suitably mounted upon this post.

The other end of the bar 6 projects inwardly from the inner end of the bracket 4 to carry a short post 19 which has a socket formed therein corresponding to the diameter of the shaft or bar 6. The post is secured to the shaft 6 by set screw 20. A brace 21 is likewise seated in the upper portion of the post 19 and the brace extends across the well of the rumble seat to the corresponding post and duplicate apparatus on the other side thereof, as will be well understood from the drawing by those skilled in the art.

When not in use, the wings are folded under the windshield, the lock bars 9 disengaged from the guide rails 1, the latches 15 lifted and the entire unit guided down the rails until the rods 6 reach the bottom of their track. When in this position, the wings are unfolded so that they are substantially parallel with the sides of the body and rest upon cushioned clips 22 which are fixed to the struts B.

When the windshield is to be raised, these wings are again folded against the face of the windshield and the unit pulled up the inclined guide rails until the opposite end of the track is reached. The latches 15 automatically fall into position behind the rods 6, and the lock bolts 9 are moved into locking engagement with the rails 1 as previously described. These bolts are fastened in position by nut 12.

It is well known that such a windshield is subjected to considerable wind pressure. The provision of spaced means 6 and 9 insure its rigidity in upright position.

Having thus described my invention, I claim:

1. A windshield mounting for rumble seats comprising a pair of spaced, inclined guide rails, windshield supports and a windshield mounted thereon, said supports having means for engaging said guide rails and being slidable thereon, and slidable arms carried by said supports and spaced from said engaging means for locking the support with respect to the upper ends of said guide rails.

2. A windshield mounting for rumble seats comprising a pair of spaced, inclined guide rails, windshield supports carried thereby and a windshield mounted thereon, each support having a plurality of means for engaging said guide rails, one of said means being slidable in each support for locking same with respect to said guide rails at a point spaced from the other means, and means for locking said slidable means with respect to said support.

3. A windshield mounting for rumble seats comprising a pair of spaced inclined guide rails having a longitudinal slot extending substantially throughout its length and a hole spaced from the end of said slot at the upper end of said guide rails, a windshield support for said rails, said support having an arm slidable in said slot, a bar slidable in said support and spaced from said arm for engaging said hole when the support is raised to the upper end of said guide rails, and means for locking said arm and bar with respect to said support.

4. A windshield mounting for rumble seats comprising a pair of spaced guide rails constructed and arranged to be secured to the body of an automobile, windshield supports having means slidable in said guide rails, bosses formed on said supports, posts secured in said bosses, windshields carried by said posts, and means independent of said slidable means carried by each support for locking same to said guide rails at points thereon, spaced from the slidable means.

5. A windshield mounting for rumble seats comprising a pair of spaced inclined guide rails constructed and arranged to be secured to the body of an automobile, windshield supports and a windshield slidably carried by said rails, spaced means, independently operable, carried by each support at one end thereof for retaining said windshield in raised position with respect to said guide rails, and a brace secured to and joining the opposite end of each support.

6. A windshield mounting for rumble seats comprising a pair of spaced guide rails constructed and arranged to be secured to the body of an automobile, and windshield supports mounted thereon, arms mounted in and extending through said supports with the outer ends of said arms in sliding engagement with said guide rails, the other ends of said arms projecting from the inner ends of said supports, a post mounted on the inner end of each arm and a brace extending between and connecting said posts.

7. A windshield mounting for rumble seats comprising a pair of spaced, inclined guide rails, each having a longitudinal slot extending substantially throughout its length and a hole spaced from the end of said slot, a windshield support adjacent each rail, a boss on each support and a windshield carrying post supported in each boss, a bar extending through each of said supports at the outer end and engaging said guide rail, the other end of each bar projecting from the inner end of each support and having a post mounted thereon, a brace connecting each post, a lock plate projecting from the outer end of each support, spaced from said bar and extending through the hole in said guide rails, and means for locking said bar and lock plate with respect to each support.

8. A windshield mounting for rumble seats comprising a pair of spaced, inclined guide rails, supports slidable in said guide rails for supporting a windshield, each support having spaced bars carried thereby, one of said bars supporting said windshield for sliding movement with respect to said rails, the other of said bars locking the said support against sliding movement when moved into engagement with said rails.

9. A windshield mounting for rumble seats comprising a pair of spaced, inclined guide rails, means slidable in said guide rails for supporting a windshield, and means on said rails independent of said slidable means for locking said slidable means and said windshield in raised position on said guide rails.

10. A windshield mounting for rumble seats and the like comprising a pair of spaced inclined guide rails constructed and arranged to be secured to the body of an automobile, windshield supports and a windshield thereon slidable on said rails, and spaced independently operable means carried by each support for supporting said windshield at spaced points in raised position on each guide rail.

FRED W. SMITH.